United States Patent [19]

Rich

[11] Patent Number: 4,794,153

[45] Date of Patent: Dec. 27, 1988

[54] POLYANHYDRIDE-SILOXANES AND POLYIMIDE-SILOXANES OBTAINED THEREFROM

[75] Inventor: Jonathan D. Rich, Ballston Lake, N.Y.

[73] Assignee: General Electric Company, Schenectady, N.Y.

[21] Appl. No.: 122,484

[22] Filed: Nov. 16, 1987

Related U.S. Application Data

[63] Continuation of Ser. No. 861,162, May 9, 1986, abandoned, which is a continuation-in-part of Ser. No. 678,725, Dec. 5, 1984, abandoned.

[51] Int. Cl.$^4$ ............................................. C08G 77/04
[52] U.S. Cl. ..................................... 528/26; 528/27; 528/41; 549/214
[58] Field of Search .................... 528/26, 27, 41; 549/214

[56] References Cited

U.S. PATENT DOCUMENTS

| | | | |
|---|---|---|---|
| 4,404,350 | 9/1983 | Ryang | 528/26 |
| 4,511,701 | 4/1985 | Ryang | 528/26 |
| 4,522,985 | 6/1985 | Ryang | 528/26 |
| 4,582,886 | 4/1986 | Ryang | 528/26 |
| 4,595,732 | 6/1986 | Ryang | 528/26 |
| 4,598,135 | 7/1986 | Buese | 528/26 |
| 4,634,610 | 1/1987 | Keohan | 528/26 |
| 4,634,755 | 1/1987 | Hallgren et al. | 528/26 |
| 4,709,054 | 11/1987 | Rich | 556/415 |

OTHER PUBLICATIONS

Eaborn, Organosilicon Compounds, Academic Press, N.Y., pp. 27 to 29 (1960).

Pratt, et al., Journal of Organic Chemistry, vol. 38, No. 25, 1973 (4271–4274).

*Primary Examiner*—Melvyn I. Marquis
*Attorney, Agent, or Firm*—William A. Teoli; James C. Davis, Jr.; James Magee, Jr.

[57] ABSTRACT

Polyimide-siloxanes are provided resulting from the intercondensation of organic diamines with organosiloxanes having terminal silyl-substituted aromatic organic anhydride groups.

10 Claims, No Drawings

POLYANHYDRIDE-SILOXANES AND POLYIMIDE-SILOXANES OBTAINED THEREFROM

CROSS REFERENCE TO RELATED APPLICATIONS

This application is a continuation of application Ser. No. 861,162, filed May 9, 1986, now abandoned, which is a continuation-in-part of my application Ser. No. 678,725, filed Dec. 5, 1984, now abandoned which is assigned to the same assignee as the present inventor and incorporated herein by reference.

BACKGROUND OF THE INVENTION

Prior to the present invention, various methods were used to make polyimide-siloxanes consisting essentially of chemically combined blocks of polydiorganosiloxane with polyimide. Holub, U.S. Pat. No. 3,325,450 shows the intercondensation of polydiorganosiloxane having terminal diorganoorganoaminosiloxy units with benzophenone dianhydride resulting in the production of polyimide-siloxane. Another procedure involved the intercondensation of polydiorganosiloxane having terminal alkyl amino groups with aromatic bis(ether anhydride) as shown by Heath et al., U.S. Pat. No. 3,847,867. A further example of polyimide-siloxanes is shown by Ryang, U.S. Pat. No. 4,404,350, utilizing a norbornane anhydride terminated organopolysiloxane intercondensed with organic diamine and optionally other aromatic bisanhydride.

The synthesis of 1,3-bis(3,4-dicarboxyphenyl)-1,1,3,3-tetramethyl disiloxane dianhydride is shown by J. R. Pratt et al., Journal of Organic Chemistry, Vol. 38, No. 25, 1973 (4271-4274). A synthesis of the Pratt et al. "siloxane anhydride", and siloxane anhydride of the formula

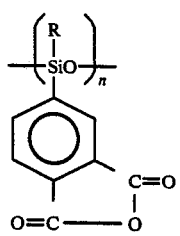

(1)

where R and n are as defined below, is shown in my copending application Ser. No. 765,089, filed Aug. 13, 1985, now U.S. Pat. No. 4,709,054 which is assigned to the same assignee as the present invention and incorporated herein by reference. These siloxane anhydrides can be made by effecting reaction between a functionalized disilane and an aromatic acyl halide in the presence of an effective amount of a transition metal catalyst and thereafter hydrolyzing the resulting halosilyl aromatic anhydride.

The present invention is based on my discovery that siloxane anhydride of Formula (1), aromatic anhydride terminated organopolysiloxane of the formula

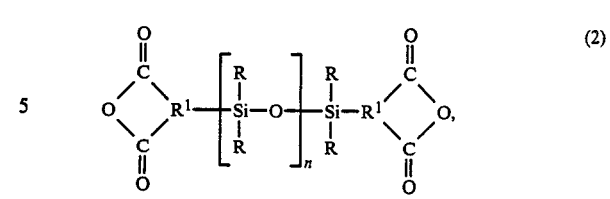

(2)

or equilibrated mixtures thereof, can be used to make polyimide-siloxane by intercondensation with organic diamine having the formula $$NH_2R^2NH_2, \quad (3)$$

where R is a $C_{(1-14)}$ monovalent hydrocarbon radical or a $C_{(1-14)}$ monovalent hydrocarbon radical substituted with the same or different radicals neutral during intercondensation, $R^1$ is a $C_{(6-14)}$ trivalent aromatic organic radical, $R^2$ is a $C_{(2-20)}$ divalent organic radical, and n is an integer equal to 1 to about 2000 inclusive. In Formula (2), n is preferably 5 to about 2000 inclusive.

The siloxane anhydrides of Formulas (1) and (2) and mixtures thereof also can be equilibrated with cyclopolydiorganosiloxane of the formula

(4)

where R is as previously defined and P is an integer equal to 3 to 8 inclusive, or siloxane anhydride of Formula (1) can be equilibrated with a mixture of cyclopolydiorganosiloxane of Formula (4) and triorganosiloxane chain stopper, such as hexamethyldisiloxane. Additional chain stopper such as tetramethyldiphenyldisiloxane, 1,3-divinyltetramethyldisiloxane, or mixtures thereof also can be used.

STATEMENT OF THE INVENTION

In accordance with the present invention there is provided polyimidesiloxane having recurring chemically combined imidesiloxane groups comprising the intercondensation reaction product of (A) siloxane anhydride having chemically combined units of the formula

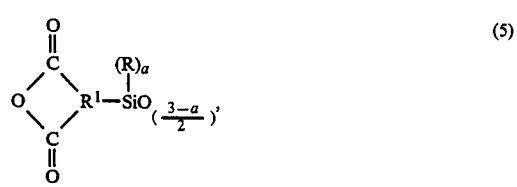

(5)

or a mixture of such siloxane anhydride units chemically combined with siloxane units of the formula,

(6)

(B) organic diamine of formula (3) where R and $R^1$ are as previously defined, a is a whole number equal to 0 to 2 inclusive and b is a whole number equal to 0 to 3 inclusive.

In another aspect of the present invention, there is provided, polyimide-siloxane which comprise repeating chemically combined siloxane imide groups of the formula

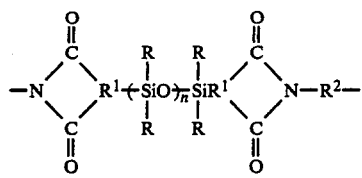 (7)

or a repeating mixture of such siloxane imide groups and imide groups of the formula

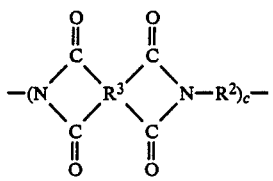 (8)

where R, R¹, R² and n are as previously defined, R³ is a tetravalent C$_{(6-14)}$ aromatic organic radical defined below n is as previously defined and c is an integer equal to 1 to 200 inclusive.

In a further aspect of the present invention, there is provided polyimide-siloxane having repeating chemically combined groups of the formula

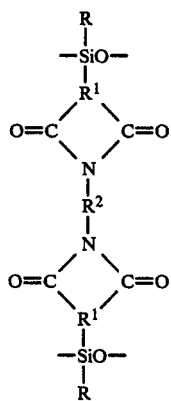

where R, R¹ and R² are as previously defined.

Radicals included within R of Formulas (1–7 and 9) are for example C$_{(1-8)}$ alkyl radicals and halogenated alkyl radicals, for example, methyl, ethyl, propyl, butyl, octyl, trifluoropropyl, etc.; alkenyl radicals, for example, vinyl, allyl, cyclohexenyl etc.; aryl radicals and halogenated aryl radicals, for example, phenyl, chlorophenyl, tolyl, xylyl, biphenyl, naphthyl, etc.;

Radicals included within R¹ are, for example,

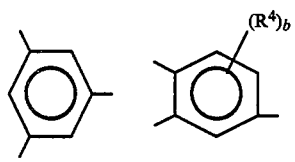

where R⁴ are monovalent neutral radicals such as C$_{(1-8)}$ alkyl, halo, and C$_{(1-8)}$ slkoxy, and b is an integer having a value of from 1 to 3 inclusive.

Radicals included within R² are, for example, divalent C$_{(2-20)}$ organic radicals selected from the class consisting of C$_{(6-20)}$ aromatic hydrocarbon radicals, halogenated C$_{(6-20)}$ aromatic hydrocarbon radicals, alkylene radicals, and cycloalkylene radicals, C$_{(2-8)}$ organo terminated polydiorganosiloxane, and divalent radicals included by the formula,

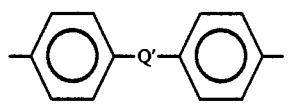

where Q' is a member selected from the class consisting of

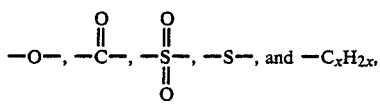

and x is a whole number from 1 to 5 inclusive.

Radicals included within R³ of Formula (8) are, for example,

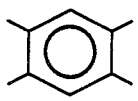

and

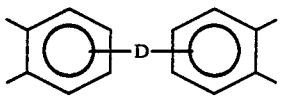

where D is a member selected from

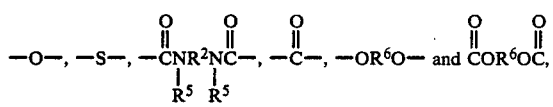

where R² is as previously defined, R⁵ is selected from hydrogen and R, R⁶ is member selected from

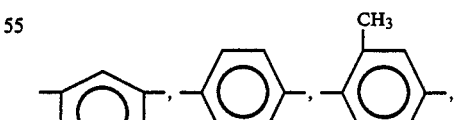

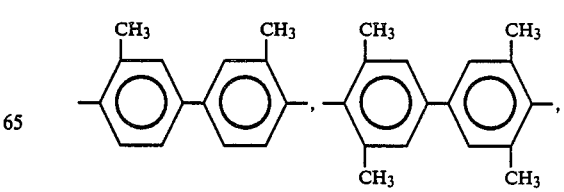

-continued

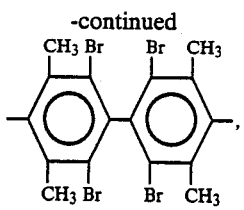

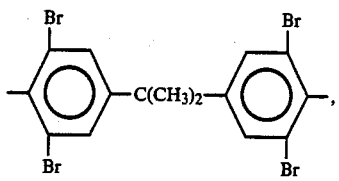

and divalent organic radicals of the general formula,

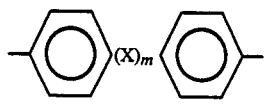

where X is a member selected from the class consisting of divalent radicals of the formulas,

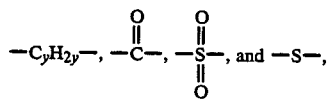

where m is 0 or 1, and y is a whole number equal to from 1 to 5.

Organic dianhydrides which can be used in combination with the siloxane anhydrides of Formula (1) and (2) or mixtures thereof in the practice of the present invention are, for example, pyromellitic dianhydride, benzophenone dianhydride, aromatic bis(ether anhydride) of Heath et al. and silylnorbornane anhydride as shown by Ryang, U.S. Pat. No. 4,381,396, assigned to the same assignee as the present invention.

Included within the organic diamines of formula (3) are compounds or mixtures thereof such as
m-phenylenediamine;
p-phenylenediamine;
4,4'-diaminodiphenylpropane;
4,4'-diaminodiphenylmethane; benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-diaminotoluene;
2,6-diaminotoluene;
2,4-bis(p-amino-t-butyl)toluene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,15-octadecanediamine;
bis(3-aminopropyl)sulfide;
N-methyl-bis(3-aminopropyl)amine;
hexamethylenediamine;
heptamethylenediamine;
2,4-diaminotoluene;
nonamethylenediamine;
2,6-diaminotoluene;
bis-(3-aminopropyl)tetramethyldisiloxane, etc.

The polyimide-siloxanes of the present invention can be synthesized by effected reaction at temperatures in the range of from 150° C. to 350° C., substantially equal molar amounts of the siloxane anhydride, or a mixture of siloxane anhydride and organic dianhydride, with the organic diamine in the presence of an inert organic solvent.

Organic solvents which can be utilized are, for example orthodichlorobenzene, meta-cresol, and dipolar aprotic solvent, for example dimethylformamide, dimethylacidamide, N-methylpyrrolidone. The siloxane dianhydride of formula (2), where n is greater than 1, for example n' having a value of from about 5 to about 2000, can be made by equilibrating the siloxane dianhydride of formula (2) where n is 1 with cyclopolysiloxanes such as hexaorganocyclotrisiloxane or octaorganocyclotetrasiloxane in the presence of a conventional equilibration catalyst.

Some of the polyimide-siloxanes can be block polymers and can be used as insulation for electrical conductors, adhesives, molding compounds, coatings for making laminates and tough elastomers.

In order that those skilled in the art will be better able to practice the invention, the following examples are given by way of illustration and not by way of limitation. All parts are by weight.

EXAMPLE 1

A mixture, consisting of 20.0 grams of 1,3-bis-(4'-phthalic anhydride)tetramethyldisiloxane, 5.1 grams of meta-phenylenediamine and 71 ml of ortho-dichlorobenzene was heated to reflux temperature. The mixture was refluxed for 2 hours with water azeotrope constantly being removed. Material started to precipitate from solution and the heating was ceased. There was then added to the mixture, 100 ml of methylene chloride after the solution cooled and the resulting homogeneous product mixture was poured into 500 ml of rapidly stirring methanol. A white product precipitated. The procedure was repeated and additional product was obtained and the resulting product dried in vacuo. There was obtained 23.4 grams or 100% yield of material. Based on method of preparation, the product was a polyimide-siloxane consisting essentially of chemically combined units of the formula

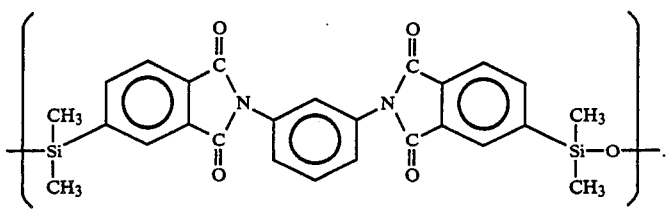

Analysis by GPC indicates the product has a molecular weight of about 75,000. The polyimide-siloxane has a Tg of 169° C. and an IV in chloroform of 0.76. A valuable insulating coating is formed on a copper wire when the wire is dipped into a 10% solution of the polymer in chloroform and allowed to air dry.

EXAMPLE 2

A mixture of 5 grams of 1,3-bis(4'-phthalic anhydride)tetrasiloxane in 50 ml of orthodichlorobenzene containing 0.5 ml of fuming sulfuric acid and 1.0 ml of concentrated sulfuric acid was heated to 110° C. for 18 hours. The mixture was allowed to cool to room temperature and 100 ml of methylene chloride was added and an excess of sodium bicarbonate was introduced to neutralize the acid. The solution was filtered with decolorizing carbon and the solvent removed in vacuo. The product was then heated to 80° C. under high vacuum 0.01 torr to remove any volatile products. There was obtained a clear viscous oil which was a polydimethylsiloxane having an average of about 16 chemically combined dimethylsiloxy units with terminal dimethyl silicon anhydridesiloxy units. Based on method of preparation and proton NMR and IR analysis, the product had the following formula,

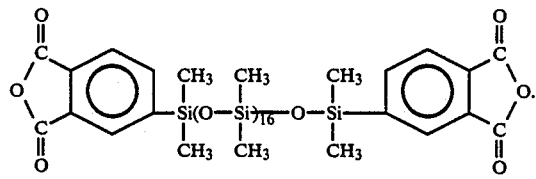

EXAMPLE 3

A mixture of 50 ml of toluene, 7 grams of bis(phthalic anhydride)tetramethyldisiloxane, 29 grams of octamethylcyclotetrasiloxane and 75 µl of a fluoromethane sulfonic anhydride and 26 µl of water was heated to 67°. After 48 hours, the resulting homogeneous solution was cooled to room temperature and the acid neutralized with 300 milligrams of anhydrous magnesium oxide. Approximately 100 ml of methylene chloride was introduced into the mixture and the solution was filtered using decolorizing carbon. The mixture was stripped of solvent in vacuo and the resulting viscous oil was heated to 80° C. under 0.01 torr vacuum to remove any volatile cyclosiloxanes. No sublimation of phthalic anhydride was observed, indicating that equilibration occurred without end group cleavage. There was obtained 21.4 grams of a clear viscous oil representing 59% of isolated yield. Based on method of preparation, proton NMR, and infrared analysis the product was a polydimethylsiloxane having an average of 27 chemically combined dimethylsiloxy units and terminal dimethylsiloxy phthalic anhydride siloxy units.

A mixture of 5 grams of the above equilibrated siloxane dianhydride, 4 grams of 1,3-bis(4'-phthalic anhydride)tetramethyldisiloxane and 1.24 grams of metaphenylene diamine was heated to reflux in 30 ml of orthodichlorobenzene in the presence of a catalytic amount of 4-dimethylaminopyridine. Water was formed during the reaction, and it was removed continuously during the 2 hour heating period. After cooling, an additional 75 ml of methylene chloride was added to the mixture to redissolve precipitated product. The mixture was then poured into methanol and product was precipitated twice, separated and then dried. There was obtained 2 grams of a product which was dissolved in 10 ml of chloroform. There was obtained a 10 micron transparent thermoplastic elastomeric film when the product was cast. Based on method of preparation, the product was a polyimide-siloxane consisting essentially of chemically combined units of the formula

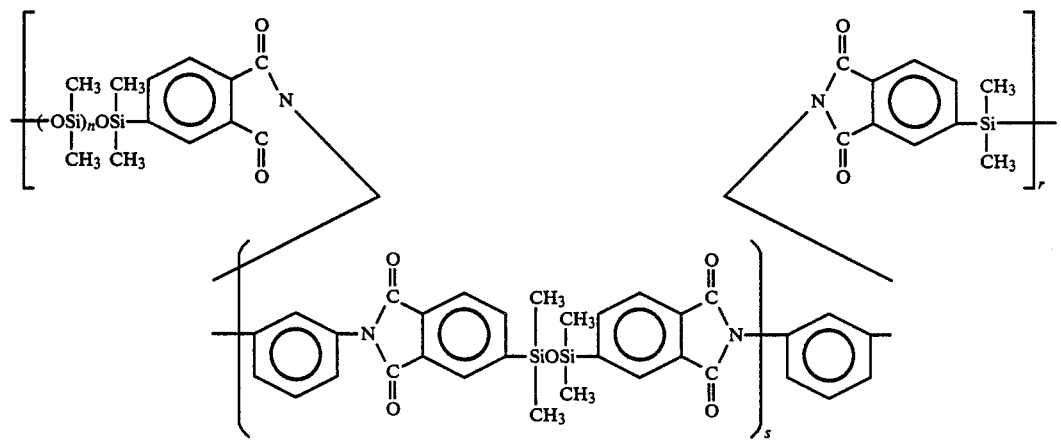

where r and s are positive integers within the definition of n as previously defined. GPC analysis established that the polyimide-siloxane had a molecular weight of about 173,000 and an IV of 1.2 in chloroform. It was found that the polyimide-siloxane could be readily extruded onto copper wire and exhibited valuable insulating and dielectric properties.

EXAMPLE 4

A mixture containing 5 grams of the equilibrated siloxane dianhydride described in Example 3, 1.7 grams of benzophenone dianhydride, and 1.24 grams of m-phenylenediamine were heated to reflux in 30 ml of o-chlorobenzene in the presence of a catalytic amount of 4-dimethylaminopyridine. Water was removed continuously during the two hour heating period. A product was isolated in a manner similar to that described in Example 3. Based on the method of preparation the product was a polyimide-siloxane consisting essentially of chemically combined units of the formula

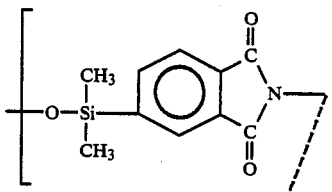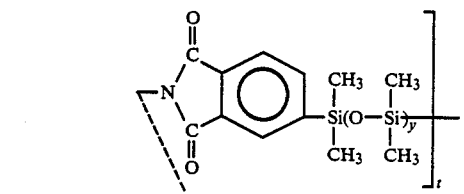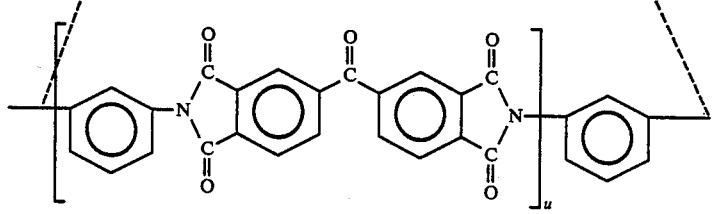

where t and u are as defined for r and s in Example 3.

EXAMPLE 5

To 25 ml of a methylene chloride solution containing 0.5 grams of 4-dichloromethylsilylphthalic anhydride was added a 5 fold molar excess of water. After drying and removal of the solvent in vacuo, there was obtained a quantitative yield of a methyl siloxane having pendant silylphthalic anhydride groups within the scope of Formula 1, as shown by NMR and IR analysis. The methylsiloxane was added to 5 grams of a polydimethylsiloxane fluid having terminal dimethylsiloxy phthalic anhydride units and an average of 27 chemically combined dimethylsiloxy units. The mixture was dissolved in 50 ml of toluene and 2 drops of concentrated sulfuric acid was then added. The resulting solution was heated for 4 hours at 80° C. After cooling, 50 ml of methylene chloride was added and the solution neutralized with sodium bicarbonate, followed by drying and removal of the solvent in vacuo. To the resulting silicone fluid was added 0.5 grams of m-phenylenediamine and the mixture heated to remove water. The resulting cross-linked polymer was a tough rubber with valuable insulating and dielectric properties.

EXAMPLE 6

There was heated to 75° C., a 50 ml toluene solution of 3.0 g of 4-phthalicanhydride-methylsiloxane of Example 5, 3.0 g of octamethylcyclotetrasiloxane, and 6 mg of hexamethyldisiloxane as a chain terminator. A catalytic amount of Nafion acidic resin was introduced and the mixture heated to 75° C. for 15 hours. Filtration of the catalyst and removal of the toluene solvent in vacuo gave a trimethylsiloxy terminated copolymer containing dimethylsiloxy and 4-phthalicanhydride, methylsiloxy units. NMR and infrared analysis were consistent with the copolymer structure. The polymer was readily cross-linked with a polyamine such as gamma aminopropyltetramethyldisiloxane to produce a tough cross-linked thermoplastic silicone elastomer.

EXAMPLE 7

A mixture of 30 gm (0.11 mole) of hexachlorodisilane and 23 gm (0.11 moles) of trimellitic anhydride acid chloride is reacted at 145° C. under a nitrogen atmosphere in the presence of 1 mole palladium (11) on silica gel. Carbon monoxide is evolved and tetrachlorosilane is removed continuously as it forms. Vacuum distillation of the resulting mixture is found to provide 4-trichlorosiloylphthalic anhydride.

Hydrolysis of the 4-trichlorosilylphthalic anhydride provides a cross-linked resin having the formula

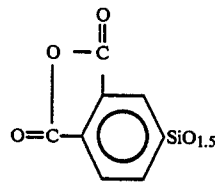

A mixture of 4-trichlorosilylphthalic anhydride and dimethyldichlorosilane is cohydrolyzed in water to produce a silicone fluid. The silicone fluid consists essentially of chemically combined siloxyphthalic anhydride units chemically combined with dimethylsiloxy units. A cured polyimidesiloxane is formed by intercondensing the silicone fluid with γ-aminopropyltetramethyldisiloxane.

Although the above examples are directed to only a few of the very many variables which can be utilized in making the polyimide-siloxanes of the present invention, it should be understood that the present invention is directed to a much broader variety of polyimide-siloxanes which can be made by effecting reaction between siloxane anhydride and organic diamine as shown in the description preceding these examples.

What I claim as new and desire to secure by Letters Patent of the United States is:

1. Polyanhydride siloxane having from about 5 to about 2000 chemically combined units comprising a mixture of silylanhydride units of the formula

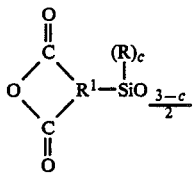

and organosiloxane units of the formula

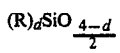

where R is selected from the class consisting of $C_{(1-14)}$ monovalent hydrocarbon radicals and monovalent $C_{(1-14)}$ hydrocarbon radicals substituted with radicals neutral during intercondensation, $R^1$ is a $C_{(6-14)}$ trivalent aromatic organic radical, c is a whole number equal to 0 to 2 inclusive and d is an interger equal to 1 to 3 inclusive.

2. A polyanhydride-siloxane in accordance with claim 1, where R is $CH_3$— and $R^1$ is

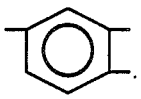

3. Polyanhydride-siloxane having the formula

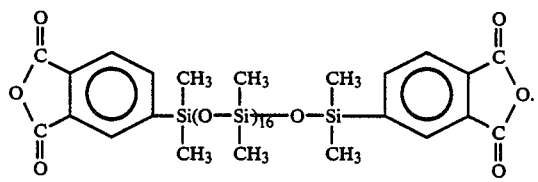

4. Polyanhydride siloxane comprising chemically combined anhydride siloxane units of the formula

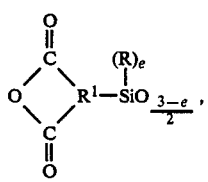

where R is a member selected from the class consisting of $C_{(1-14)}$ monovalent hydrocarbon radicals and $C_{(1-14)}$ monovalent hydrocarbon radicals and $C_{(1-14)}$ monovalent hydrocarbon radicals substituted with radicals neutral during intercondensation, $R^1$ is a $C_{(6-14)}$ trivalent aromatic organic radical, and e is a whole number equal to 0 or 1.

5. Polyanhydride siloxane in accordance with claim 4 having the formula,

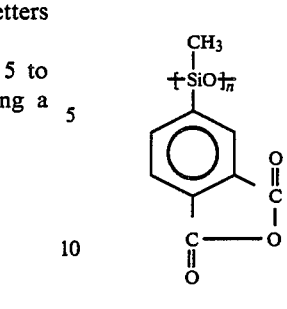

where n is an integer having a value of up to 2000 inclusive.

6. Polyanhydride siloxane in accordance with claim 4, having the formula

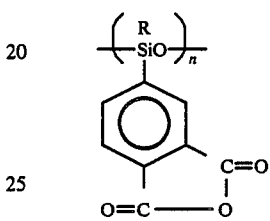

where R is a member selected from the class consisting of $C_{(1-14)}$ monovalent hydrocarbon radicals and $C_{(1-14)}$ monovalent hydrocarbon substituted with radicals neutral during intercondensation and n is an integer having a value of up to 2000 inclusive.

7. Polyanhydride siloxane in accordance with claim 4 comprising chemically combined units of the formula

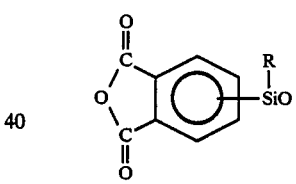

where R is a $C_{(1-14)}$ monovalent hydrocarbon radical or a $C_{(1-14)}$ monovalent hydrocarbon radical substituted with the same or different radicals neutral during intercondensation.

8. Polyahydride siloxane comprising anhydride siloxane units of the formula,

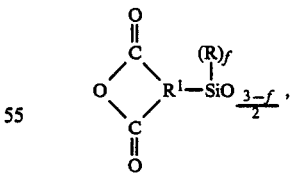

chemically combined with organosiloxane units of the formula

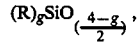

where R is a $C_{(1-14)}$ monovalent hydrocarbon radical or a $C_{(1-14)}$ monovalent hydrocarbon radical substituted with the same or different radicals neutral during intercondensation, $R^1$ is a $C_{(6-14)}$ trivalent aromatic organic radical, f is a whole number equal to 0 or 1 and g is an integer equal to 1 to 3 inclusive.
9. Polyanhydride siloxane in accordance with claim 8 where R is methyl.
10. Silylanhydride siloxane comprising chemically combined units of the formula,
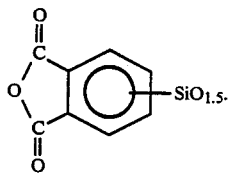
* * * * *